Sept. 17, 1957  J. R. OISHEI  2,806,241
WINDSHIELD WIPER
Filed Aug. 22, 1951
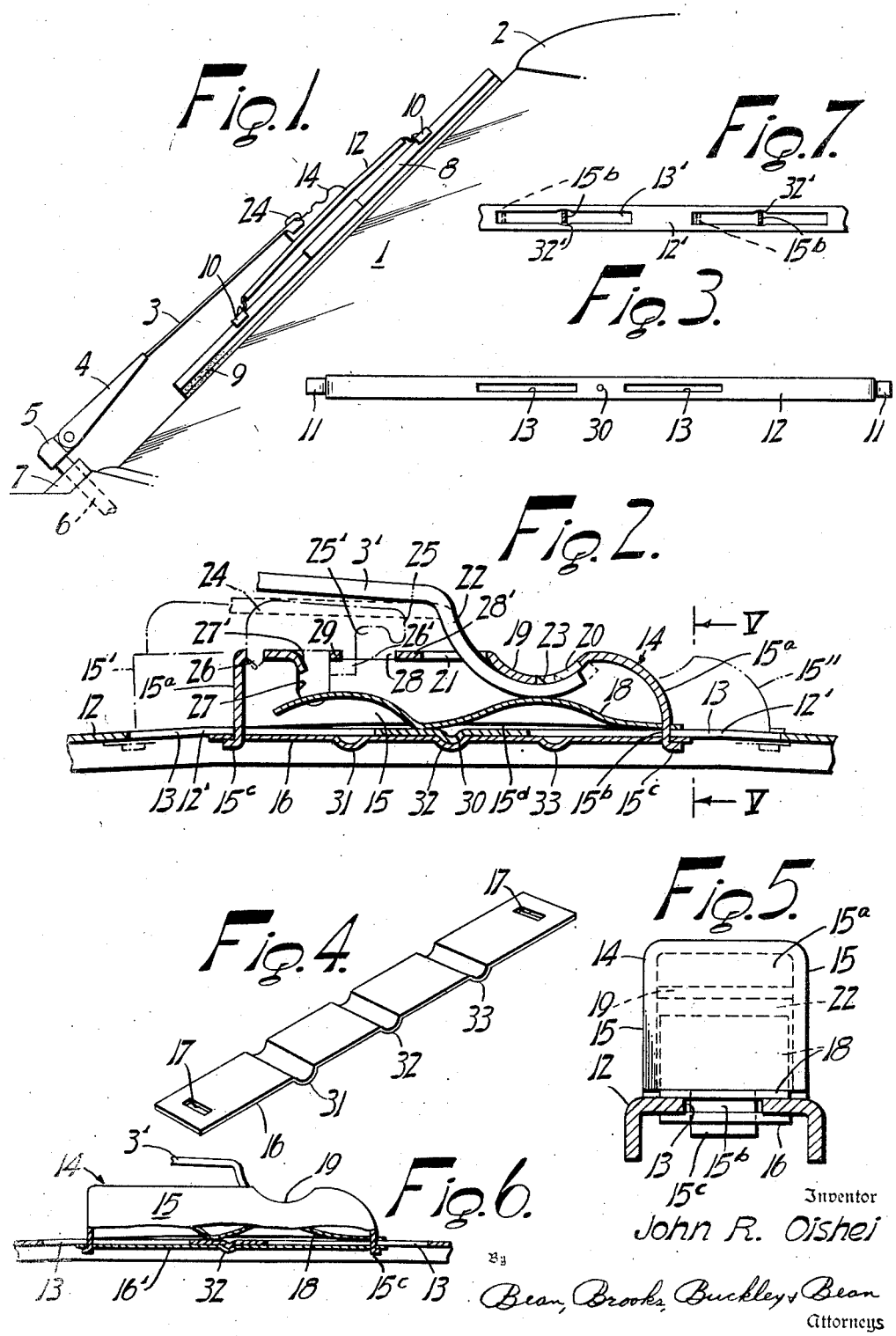
Inventor
John R. Oishei
Bean, Brooks, Buckley & Bean
Attorneys

United States Patent Office 2,806,241
Patented Sept. 17, 1957

2,806,241

WINDSHIELD WIPER

John R. Oishei, Buffalo, N. Y., assignor to Trico Products Corporation, Buffalo, N. Y.

Application August 22, 1951, Serial No. 243,076

11 Claims. (Cl. 15—250)

This invention relates generally to the windshield cleaning art, and more particularly to means for attaching a wiping element to a wiper drive arm for oscillation thereby across a predetermined area of a windshield surface.

Changes in the mode of attaching the wipers to their arms have been made from time to time with the result that wiping blades now in use have various styles of mounting clips each clip style having been designed for its particular actuating arm. As a result, it is necessary for a manufacturer to supply, and a dealer to stock, a plurality of various wiper blades having different types of attaching clips in order to meet the demand for replacement blades.

It has been proposed to provide a wiper blade with more than one attaching clip means to permit attachment of said blade to different types of wiper drive arms, but such means present an off-center position, with respect to its point of attachment to the drive arm, that impairs the wiping efficiency for obvious reasons, such as by hitting against the windshield frame during wiper operation, or by shifting the wiper path from its originally intended position.

Accordingly, it is an object of this invention to provide a universal wiper blade attachment means permitting its points of attachment to the prescribed wiper drive arms to be adjusted substantially to the mid-point on the wiper blade, or inwardly or outwardly therefrom.

In addition, it is an object of the instant invention to provide a universal clip having different attachment means, together with means permitting a shifting of the wiper blade relative to said clip to compensate for an off-center location of said attachment means and thereby enable the wiper path to be fixed in the field of vision.

It is also an object of the instant invention to provide a wiper blade having universal attaching means arranged to give preference to the more prevalent mode of attachment for the replacement field.

It is a further object of the present invention to provide a wiper blade of the aforementioned type which is relatively inexpensive to manufacture, simple and compact in construction, and completely reliable in operation.

The foregoing and other objects will become apparent upon a perusal of the ensuing specification, taken together with the accompanying drawing wherein:

Fig. 1 shows the wiper blade of the instant invention mounted in place on a vehicle windshield;

Fig. 2 is a side view in section of the novel attaching clip means of the instant invention;

Fig. 3 is a plan view of the pressure distributing yoke member of the wiper blade of the instant invention;

Fig. 4 is a perspective view of the friction shoe forming a part of the attaching clip means;

Fig. 5 is an end view of the attaching clip means of the instant invention taken along the line V—V of Fig. 2;

Fig. 6 is a fragmentary view of a modification; and

Figure 7 is a similar view of another embodiment.

As shown in Fig. 1, the wiper blade of the instant invention is mounted on a flat windshield 1 of vehicle 2, and is carried by a wiper drive arm 3 which latter has the usual spring inclosing chamber 4 pivoted to an inner mounting section 5. Mounting section 5 is secured on the outer end of a rockshaft 6 that is journaled in a supporting bracket 7.

The wiper blade proper comprises a channeled holder 8 formed of inverted channel sections flexibly joined at their adjacent ends and loosely holding a squeegee 9. Two spaced attaching ears 10 are secured to the back of holder 8 to rockably receive the ends 11 of a pressure distributing supporting yoke member 12 the ends being flat transversely to exert a normalizing influence on the holder and its squeegee. This blade construction is more clearly disclosed in copending application Serial No. 185,732, now Patent No. 2,659,923.

The universal attaching clip means of the instant invention is adjustably mounted, as by means of the two alined slots 13, and comprises a body or housing 14 having side walls 15 and end walls 15a, the latter having reduced and depending extensions 15b providing pins that are slidably engageable in the slots 13. A brake shoe 16, preferably in the form of a flat bar or strip, underlies the central portion of the yoke 12 and frictionally bears upon the underside thereof where it is held by the tabs 15c which pass through openings 17 in the opposite ends of the shoe and are clinched as shown in Fig. 2. The shoe may in this manner be brought to bear upon the yoke with the desired frictional grip to secure the clip body in a given adjustment on the yoke.

The clip housing 14 has a chamber which encloses a curved spring element 18 that is apertured at one end to receive one of the reduced extensions 15b for securing it in place. The top wall of the clip chamber has an internal convex seat 19, formed with a circumferential slot 20, and an entranceway 21 for receiving the curved end or tongue portion 22 of the wiper arm 3'. The curved tongue 22 is passed through the entranceway 21 and nested on the convex seat 19 under the urge of the opposing spring 18, a stop shoulder 23 engaging in slot 20 to abut the inner end thereof to secure the wiper from displacement. This nested relation permits a limited amount of relative movement of the wiper circumferentially about the tongue 22 to enable the wiper resting fully upon the windshield.

In addition, housing 14 has mounted on the upper surface thereof a coupling fin member 24 with a depending hook 25 spaced from the housing to accommodate the type of wiper arm 3, Fig. 1. The housing is suitably apertured to receive anchoring lugs 26 and 26' on the fin to mount the latter across the open end of a vertical slot 27. The lug 26' is formed with an undercut to effect a breakable interlock with a cross bar 29 and thereafter the lug 26 is inserted and swaged over. Thus, when it is desired to attach the wiper blade of the instant invention to the wiper arm 3, which has a slot in its outer end, the hook portion 25 is passed through the slot to engage the fin therein. The fin member may also be employed to attach the wiper blade to one of the first types of drive arms utilizing a cotter pin or cross screw which latter was passed through the enlarged opening 25' provided by the hook 25. The vertical slot 27 is designed to receive a cross pin of another type of wiper arm, the cross pin being fixed instead of removable like the screw type. A keeper projection 27' yields to admit the cross pin and serves to secure it therein. A further opening 28 is provided in the housing to receive an earlier type of wiper arm terminating in a wire hook that engages about the cross bar 28'.

The slot 27, the opening 28, and the entranceway 21 are all blocked by the fin member 24. This permits a factory mounting of the fin which is the only projecting coupler part on the universal clip. The removal of the fin gives access to the several remaining coupler parts 21, 27 and 28 for being engaged with the cooperating coupler parts on the respective arms. When it becomes necessary to replace wiper blades on other styles of wiper arms, the fin is detached and for this purpose the anchorage for lug 26' is designed to be broken by lightly prying up on the outer end of the hook 25 and thereafter the lug 26 is readily disengaged.

It will be noted that certain coupler parts of the attaching clip occupy off-center positions when the clip 14, 16 is located centrally of the wiper blade assembly. This is compensated for by slidably adjusting the clip to different positions along the yoke, as previously stated. The friction shoe 16 may be so set as to firmly hold the clip in any adjustment. Or, the several positions of the adjustable clip may be made definite by suitable detent means. To this end the yoke member is provided with a downwardly extending detent 30 at its mid-point between the slots 13 for selective engagement in one or more recesses on the clip which are conveniently provided in the friction shoe 16. This arrangement provides cooperating shoulders on the yoke and clip. These recesses are in the form of transversely extending grooves 31, 32 and 33, each associated with a respective coupling part 27, 28 and 21 which grooves are so disposed as to properly determine the several positions of the clip when engaged by the detent 30. The coupling parts 24 and 25' will coincide with the seats 31 and 32. While three recesses are shown in the flat shoe-forming strip, it is understood that a different number may be used if desired, or the adjustment may be held by the friction hold alone. Fig. 6 shows a friction shoe with a single recess 32 to determine the central position from which the clip may be adjusted to either side for being held by friction. The single recess of the shoe 16' will serve to facilitate the central placement of the wiper on the windshield. The user will sense the central position by touch or "feel," which may likewise be determined without the use of any detent by having the guiding extensions 15b frictionally fit their slots 13' in the yoke 12' at the opposite sides of enlarged central recesses 32', as depicted in Fig. 7. Therefore, when the clip is adjusted from either end position, the extensions will ride out of frictional contact with the walls of the slots and into the clearance enlargements with a sudden release or freedom which will be felt thereby to determine its central position.

Fig. 2 shows in solid lines the central position of the clip on the yoke, with detent 30 engaging in recess 32. If it should be found necessary or desirable to shift the wiper blade outwardly the clip will be slid inwardly to the dot and dash line position 15' to bring the recess 33 into registry with the detent. Again, the clip may be moved outwardly to the double dot and dash line position 15" to effect another coupling in which position the detent will engage in recess 31. Thus, the longitudinal midpoint of the wiper blade can be adjusted to a plurality of different positions to center the blade with respect to its point of attachment to the drive arm, and the wiper blade is therefore adapted for use in a variety of different windshield cleaner installations.

By forming the recesses 31, 32, 33 in the form of grooves the length of the flat strip 16 is in effect increased for detent disengagement while the opposite end portions of the strip serve firmly to frictionally hold the clip in any intermediate adjustment under the binding pressure of the clinched tabs 15c. The flat shoe 16 is guidingly received within the channel of the yoke, and where the yoke is not used the holder 8 may be provided with the longitudinal slots 13 and shaped to receive the friction shoe. Herein, the yoke is considered as a part of the holder, whereby yoke 12 and the channeled holder 8 are each holder means and together comprise, in the illustrated embodiments, the holder assembly.

The central portion of the yoke is shown flat while the opposite end portions are angularly displaced as indicated at 12', in which event the bottom edges of the side walls 15 may be slightly arched, as at 15d, to provide the necessary clearance for maintaining a firm seating engagement at the opposite ends of the clip upon the yoke against lateral rocking.

The present invention fully accomplishes its aforesaid objects, and provides a wiper blade having a universal attaching clip with means for adjusting the position of the clip along the lengthwise extent of the wiper blade. Thus, the wiper blade of the instant invention can be adjusted to accommodate itself to virtually any windshield cleaner installation. While the foregoing description has been given in detail it is without thought of limitation since the inventive principles are capable of assuming other physical embodiments without departing from the spirit of the invention and the scope of the appended claims.

What is claimed is:

1. A vehicle window wiper comprising, an elongated wiping element, a holder assembly therefor, an attaching clip carried by said holder assembly of the type having a number of coupler means having individually different coupling characteristics spaced apart in the lengthwise direction of said wiping element for attachment to wiper actuating arms that are similarly individually different, and means for selectively adjusting the position of said attaching clip relative to said holder assembly in the lengthwise direction of said wiping element to compensate for the lengthwise spacing of said coupler means and thereby maintain substantially the same wiper path on an associated vehicle window surface when the wiper is attached to any of such arms, said last named means including means releasably holding said attaching clip in adjusted position.

2. A vehicle window wiper blade comprising, a holder assembly having an elongated pressure distributing member, a wiper element carried by said holder assembly, and an arm attaching clip adjustably carried by said pressure distributing member for positional adjustment therealong in the lengthwise direction of said wiping element, said attaching clip including brake shoe means comprising a substantially flat member elongated lengthwise of said pressure distributing member and frictionally bearing thereagainst throughout substantially the full length of said shoe member to releasably hold said attaching clip in adjusted position on said pressure distributing member.

3. A windshield wiper blade comprising, holder means, an elongated wiper element retained by said holder means, said holder means including yoke means having slot means therein and extending lengthwise of said wiper element, and an arm attaching member slidable upon said yoke means and having parts spaced apart lengthwise of said yoke means and extending through and movable within said slot means to enable positional adjustment of said attaching member along said yoke means, said attaching member including means carried by said spaced parts thereof and cooperating with said yoke means to bias said attaching member against movement therealong.

4. A windshield wiper blade comprising, a holder assembly, a wiper element carried by said holder assembly, a wiper arm connector mounted on said holder assembly for relative movement thereon lengthwise thereof, a detent on said holder assembly at approximately the longitudinal mid-point thereof, and a substantially flat shoulder-bearing member elongated lengthwise of said wiper element and secured to said connector at spaced points adjacent the opposite ends of said shoulder-bearing member for frictionally bearing against said holder assembly for a substantial portion of the length of said shoulder-bearing member said shoulder-bearing member cooperating with said detent to bias said connector into any one of a plurality of positions relative to the longitudinal mid-point of said wiper element.

5. A vehicle window wiper blade comprising, a wiping element carried by said holder means, arm attaching clip means adjustably mounted on said holder means, and means for selectively adjusting the position of said clip means with respect to the longitudinal mid-point of said wiper blade, said last-named means including slot means in said holder means in substantially lengthwise alinement with said wiping element, pin means carried by said clip means and slidable in said slot means, means providing a detent on said holder means and a plurality of shoulder means on said attaching clip means cooperating with said detent for releasably holding said attaching clip means in adjusted position.

6. A windshield wiping blade having holder means formed with longitudinal slot means, an arm attaching clip slidable on said holder means to adjust its position thereon and having end walls each with a depending extension guidingly received by said slot means, and a friction shoe supported by said extensions against the underside of said holder means for securing said clip in its adjusted position thereon.

7. A windshield wiping blade having holder means formed with longitudinal slot means, an arm attaching clip slidable on said holder means to adjust its position thereon and having end walls each with a depending extension guidingly received by the slot means, and a flat shoe supported by said extensions at the underside of said holder means and having a shoulder interlockable with a shoulder on said holder means to secure said clip in adjusted position.

8. A windshield wiping blade having holder means formed with longitudinal slot means, an arm attaching clip slidable on said holder means to vary its position thereon and having depending guide parts received in said slot means, and a flat shoe supported by said guide parts at the underside of said holder means and having a transverse groove extending for its entire width to interlock with a shoulder on said holder means.

9. A windshield wiping blade having holder means formed with longitudinal slot means, an arm attaching clip slidable on said holder means for selective positioning thereon and having depending guide parts frictionally fitting said slot means, and means for retaining said clip on said holder means, said slot means being enlarged at intervals to free said guide parts thereby to determine the position of said clip on said holder means.

10. A windshield wiper blade assembly comprising holder means, a wiping element carried by said holder means, an arm attaching clip adjustably positioned on said holder means, spaced coupling means on said clip for attachment to different types of wiper drive arms, and means for adjusting the position of said clip with respect to the longitudinal mid-point of said wiper blade assembly to compensate for an off-center location of either of said spaced coupling means, together with means providing a detent on said holder means and a plurality of shoulder means on said attaching clip cooperating with said detent for releasably holding said attaching clip in any of several preselected adjusted positions related to said spaced coupling means so as to substantially center said blade assembly with respect to its point of attachment to any such drive arm.

11. A wiping blade as set forth in claim 6, wherein said holder means is of inverted channel formation and said friction shoe is contained therewithin.

References Cited in the file of this patent

UNITED STATES PATENTS

| | | |
|---|---|---|
| 2,276,556 | Zaiger | Mar. 17, 1942 |
| 2,643,410 | Nesson | June 30, 1953 |